United States Patent [19]

Fang

[11] Patent Number: 4,635,680
[45] Date of Patent: Jan. 13, 1987

[54] SAFETY GAS FLOW REGULATOR

[76] Inventor: Reuy-Feng Fang, No. 106, Po Ai Road, San Min District, Kaohsiung, Taiwan

[21] Appl. No.: 774,411

[22] Filed: Sep. 10, 1985

Related U.S. Application Data

[63] Continuation-in-part of Ser. No. 576,309, Feb. 2, 1984.

[51] Int. Cl.[4] .............................................. F16K 15/00
[52] U.S. Cl. ............................ 137/614.18; 137/519.5; 137/614.2
[58] Field of Search ................ 137/522, 614.18, 614.2, 137/901, 519.5

[56] References Cited

U.S. PATENT DOCUMENTS

| | | | |
|---|---|---|---|
| 3,407,827 | 10/1968 | Follett | 137/39 |
| 3,981,328 | 9/1976 | Yonezawa | 137/614.2 |
| 4,257,448 | 3/1981 | Shiu et al. | 137/460 |

FOREIGN PATENT DOCUMENTS

| | | | |
|---|---|---|---|
| 544834 | 8/1956 | Italy | 137/614.2 |
| 550424 | 10/1956 | Italy | 137/614.2 |

Primary Examiner—A. Michael Chambers

[57] ABSTRACT

This invention relates to a safety gas flow regulator and in particular to one having a body portion formed with a first seat and a second seat, a safety valve engaged with the second seat, a tubular member having two holes being designed so that their center lines intersect each other at a point, a ball disposed in the tubular member, an exhaust mechanism engaged with the first seat, a plunger rod extending downwardly through the exhaust mechanism, a turning knob located on top of the exhaust mechanism, and a cap threadedly engaged with a neck of the turning knob and the top end of the plunger rod.

3 Claims, 6 Drawing Figures

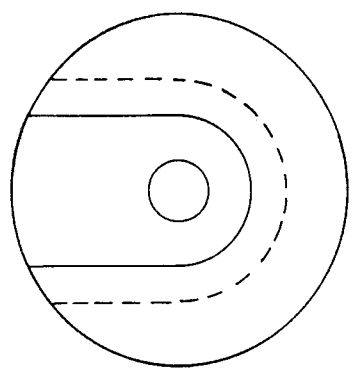
F I G.5
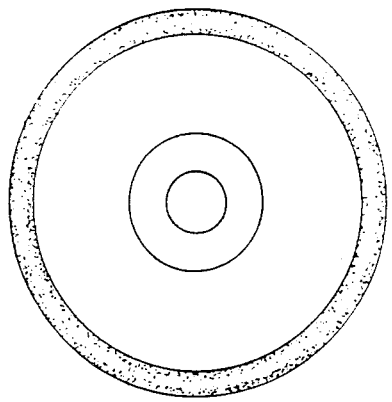
F I G.6

SAFETY GAS FLOW REGULATOR

CROSS-REFERENCE TO RELATED APPLICATION

This application is a continuation-in-part of applicant's co-pending application Ser. No. 576,309, filed Feb. 2, 1984.

BACKGROUND OF THE INVENTION

Nowadays, gas has become one of the most important energy sources in the world because of its high economic value and availability. Unfortunately, the gas leads to a vast number of accidents which are mainly caused by the following:
1. The welding junction of the gas tank is excessively corroded.
2. The tubing connecting the cooker to the gas tank becomes chapped.
3. The valve of the cooker connected with the gas tank is damaged.
4. The throttling valve of the gas tank is impaired.
5. The safety valve of the gas tank is broken.
6. The tubing is not closely connected with the cooker and the gas tank.

Accordingly, many kinds of safety devices adapted for use with the gas tank have been proposed; however, they cause the subscriber the following troubles:
1. The safety devices are complex in structure so that they are difficult to repair in case of rupture.
2. Such safety devices are mounted between the valve of the cooker and the throttling valve of the gas tank, so that it is impossible to prevent gas leakage that occur in areas other than that between the cooker and the safety devices.
3. Such safety devices cannot be commonly accepted by ordinary families because of their high cost.

SUMMARY OF THE INVENTION

It is the primary object of the present invention to provide a safety gas flow regulator which is especially designed for preventing gas leakage.

It is another object of the present invention to provide a safety gas flow regulator which utilizes a ball valve to cut off the gas flow from a gas tank in case of gas leakage.

It is still another object of the present invention to provide a safety gas flow regulator which is easy to operate.

It is still another object of the present invention to provide a safety gas flow regulator which is economic to produce.

It is a further object of the present invention to provide a safety gas flow regulator which is simple in construction.

It is still a further object of the present invention to provide a safety gas flow regulator which may be used to adjust the gas flow rate and prevent gas leakage.

The novel features which are characteristics of the present invention, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 5 is a bottom view of the controlling member; and

FIG. 6 is a bottom view of the plug.

DETAILED DESCRIPTION OF THE PREFERRED EMBODIMENT

In order to make the object of the present invention more concrete, the invention will be described now, not limitatively, with reference to the example illustrated in the FIGURES of the drawings.

Figure 1:
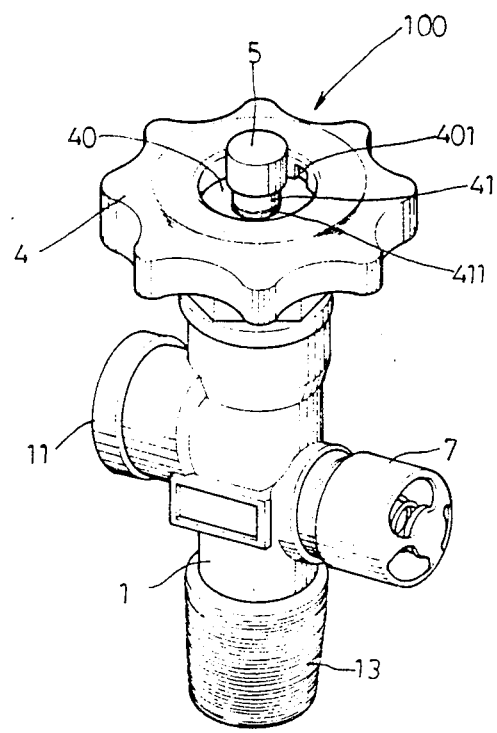
FIG. 1 is a perspective view of a safety gas flow regulator according to a preferred embodiment of the present invention.
Figure 2:
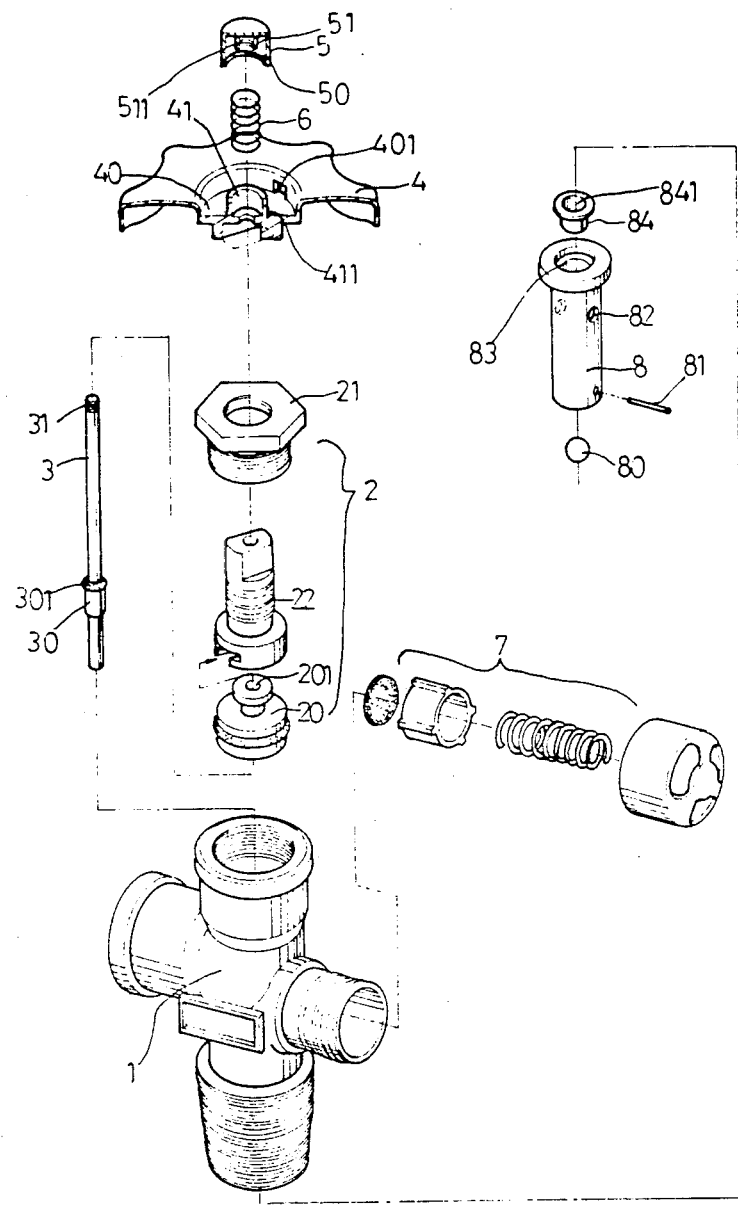
FIG. 2 is an exploded view of the safety gas flow regulator.

With reference to the drawings and in particular to FIGS. 1 and 2 thereof, the safety gas flow regulator 100 according to the present invention mainly comprises a body portion 1, an exhaust mechanism 2, a plunger rod 3, a turning knob 4, a cap 5, a spring 6, a safety valve 7 and a tubular member 8.

The body portion 1 has an outlet 11 at one side thereof, a vertical passage 12 formed at a lower part thereof and in communication with the outlet 11, and an externally threaded portion 13 at a lower end thereof. On the top of the body portion 1 is formed a first seat 14. A second seat 15 is formed in the body portion 1 and is positioned lower than the outlet 11 of the body portion 1.

The safety valve 7 is engaged with the second seat 15. However, it should be noted that the safety valve 7 is of known structure and is therefore, not described in detail.

The exhaust mechanism 2 includes a plug 20, a threaded member 21 and a controlling member 22 which are known component parts. The threaded member 21 is connected to the top of the body portion 1. The controlling member 22 is threadedly engaged with the threaded member 20 while the plug 21 is connected to the lower end of the controlling member 22. Since the threaded member 21, the controlling member 22 and the plug 20 are known component parts, they are not described in detail.

The plug 20 defines at its center a hole 201. The plunger rod 3 is provided with an enlarged portion 30 at a lower part thereof. An oil seal 301 is provided so that it encloses the plunger rod 3 and is located on the top edge of the enlarged portion 30. The plunger rod 3 is further provided with screw threads 31 at the top end thereof and a recess 32 at the lower end thereof (see FIG. 3).

The turning knob 4 has on its top an annular groove 40 having vertical walls which define therein a drain hole 401 through which water may flow out of the turning knob for Drain hole 401 acts to prevent the safety gas flow regulator 100 from being corroded. At the center of the annular groove 40 there is a neck 41 having screw threads 411 at the lower part thereof.

The cap 5 is disposed on the top of the turning knob 4 for keeping water from entering therein and thereby preventing the turning knob 4 from being corroded. Cap 5 is adapted to the neck 41 of the turning knob 4. The cap 5 is formed with internal screw threads 50 for engaging with the screw threads 411 of the neck 41 so that the cap 5 can be fixedly connected therein. In the interior of the cap 5 there is provided a neck 51 having internal screw threads 511 engageable the screw threads 31 of the plunger rod 3. The spring 6 is located within the neck 41 of the turning knob 4 so that it tends to urge the cap 5 to move upwards.

Figure 3:
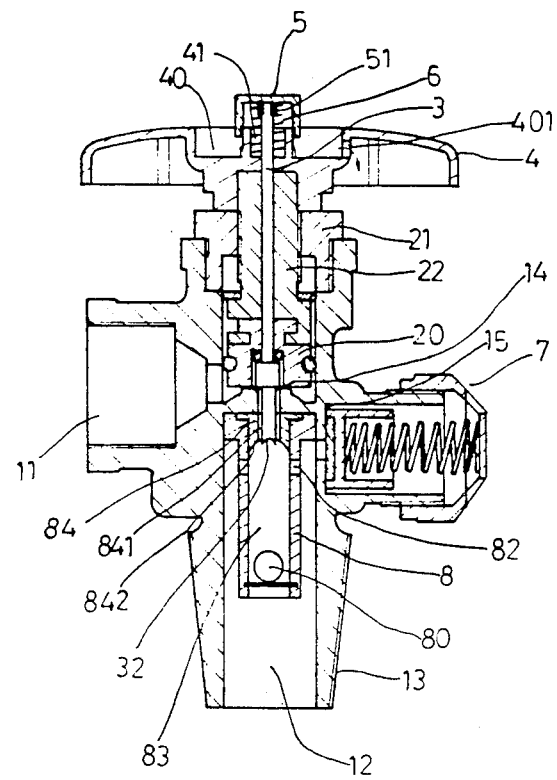
FIG. 3 is a cross-sectional view of the safety gas flow regulator.
Figure 4:
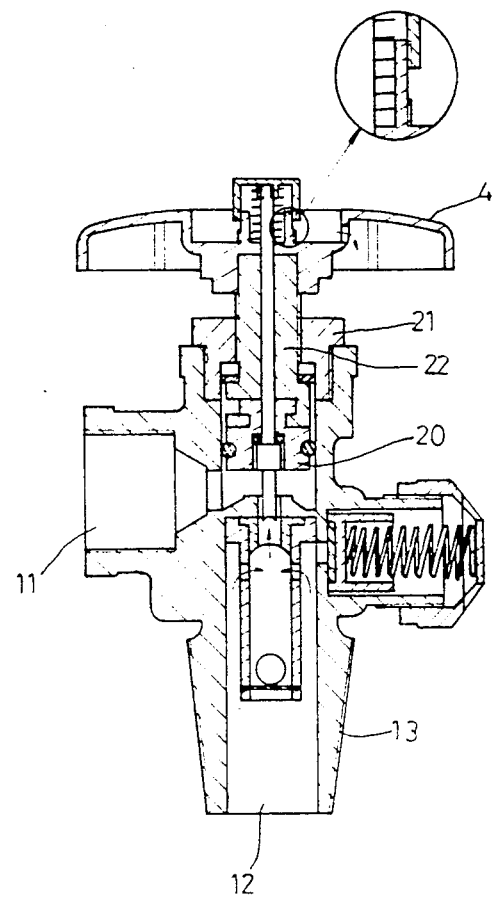
FIG. 4 shows the function of the safety gas flow regulator.

Referring to FIGS. 3 and 4, the plunger rod 3 goes through the threaded member 21, the control member 22 and the plug 20. Plunger rod 3 is provided with at least an oil ring 301 so that the plunger rod 3 can be closely fitted with the exhaust mechanism 2 to prevent gas leakage.

The tubular member 8 is provided with a passage 83 for gas to pass through from a gas tank (not shown). Furthermore, the tubular member 8 has along its length two holes 82 being designed so that their center lines intersect each other at a point. Consequently, the gas flow passing through the two holes will meet at a point thereby preventing a tungsten steel ball 80 from going upwards and blocking the passage 83 of the tubular member 8 to the outlet 11 of the body portion 1. A pin 81 is mounted at the bottom of the tubular member 8 to retain the tungsten steel ball 80 therein. On the top of the tubular member 8 is disposed a sleeve 84 having a center hole 841 in communication with the passage 83 of the tubular member 8. The sleeve 84 is formed at the bottom with a hemispherical recess 842. In the event of gas leakage resulting from the rupture of the turning knob 4, the tungsten steel ball 80 is moved upwards to block the passage 83 of the tubular member 8 so as to prevent the gas from leaking out thereof. As soon as the causes bringing about the leakage are overcome, the tungsten steel ball 80 will be attracted downwards by the gravitational force, enabling the gas to pass through the tubular member 8 to the outlet 11 again. The recess 32 of the plunger rod 3 is to cause the gas pressure to act evenly thereon such that the oil seal 301 on the plunger rod 3 can be closely fitted with the plug 20 thus preventing gas leakage. The engagement of the screw threads 31 of the plunger rod 3 with the internal screw threads 511 of a neck 51 of the cap 5 is designed so that in case safety valve fails to work, it is only necessary to press the cap 5 and then turn in clockwise direction to mesh the internal screw threads 50 of the cap 5 with the screw threads 411 of the neck 41 of the turning knob 4 thereby facilitating the release of gas.

The embodiment of the invention which has been described and illustrated herein is but an illustration of the invention. Other embodiments and modifications will occur to those skilled in the art. No attempt has been made to illustrate all possible embodiments of the invention, but rather only to illustrate its principles and the best manner presently known to practice it. Therefore, while certain specific embodiments have been described as illustrative of the invention, such other forms as would occur to one skilled in the art on a reading of the foregoing specification are also within the spirit and scope of the invention, and it is intended that this invention includes all modifications and equivalents which fall within the scope of the appended claims.

I claim:

1. A safety gas flow regulator comprising:
   a body portion having an outlet at one side thereof, a vertical passage formed at a lower part thereof and in communication with the outlet, and an externally threaded portion at a lower end thereof;
   a first seat formed on top of said body portion;
   a second seat formed in said body portion and positioned lower than the outlet of said body portion;
   a safety valve engaged with said second seat;
   a tubular member which is hollow in structure and has along its length two holes being designed so that their center lines intersect each other at a point;
   a sleeve mounted on top of said tubular member and having a hemispherical recess at bottom thereof;
   a ball disposed in said tubular member;
   a pin mounted at lower part of said tubular member for retaining said ball therein;
   an exhaust mechanism engaged with the first seat, said exhaust mechanism having a threaded member connected to top of said body portion, a controlling member threadedly engaged with said threaded member, and a plug connected with a lower end of said controlling member;
   a plunger rod extending downwardly through said exhaust mechanism and said sleeve, said plunger rod being provided with screw threads at top end thereof, an enlarged portion at a lower part thereof, and a recess at a lower end thereof;
   an oil seal enclosing said plunger rod and disposed on top edge of the enlarged portion thereof;
   a turning knob disposed on top of the threaded member of said exhaust mechanism and connected with top of the controlling member of said exhaust mechanism, said turning knob having a neck at center thereof;
   a cap threadedly engageable with the neck of said turning knob and top end of said plunger rod; and
   a spring disposed within the neck of said turning knob for urging said cap to move upwards.

2. A safety flow regulator comprising: a body portion having an inlet and an outlet; a valve element; a vertically oriented valve element receiving member for containing said valve element, said receiving member being mounted in said body and defining a passage between said inlet and said outlet and having a top portion and a bottom portion, said top portion defining two generally opposing openings in its surface; a hollow member, said hollow member lying partially within and on top of said receiving member, said hollow member having a top and a bottom, said bottom being shaped to conform to part of the surface of said valve element to sealingly engage said valve element; retaining means, said retaining means being connected to said valve element receiving member for retaining and normally supporting said valve element in said valve element receiving member; wherein upon leakage of said regulator, said valve element will move away from said retaining means and into engagement with said hollow member to block the passage between said inlet and said outlet, the weight of said valve element causing it to drop back into contact with said retaining means upon repair of said regulator.

3. A safety regulator according to claim 2 wherein said regulator is also comprised of a safety valve; a turning element connected to said body; and sealing means, said sealing means being connected said turning element and said hollow member and normally acting to constrict the passage between said inlet and said outlet; whereby upon failure of said safety valve, said turning element may be rotated to rotate said sealing means and thereby separate it from said hollow member to increase the passage size between said inlet and said outlet.

* * * * *